United States Patent
Easterwood

[15] 3,692,073
[45] Sept. 19, 1972

[54] DRAG SAW

[72] Inventor: Carl W. Easterwood, Rt. 2, Sulphur Springs, Tex. 75482

[22] Filed: Sept. 15, 1970

[21] Appl. No.: 72,433

[52] U.S. Cl. ............143/133 D, 143/135 A, 143/141
[51] Int. Cl. .........................B27b 35/02, B27b 35/14
[58] Field of Search......143/133 D, 135 A, 133, 135, 143/141; 144/344

[56] References Cited

UNITED STATES PATENTS

| | | |
|---|---|---|
| 2,751,736 | 6/1956 | Hessemer...........143/133 D X |
| 641,129 | 1/1900 | Luce et al..............143/135 A |
| 2,380,753 | 7/1945 | Segerstad...............143/135 A |
| 1,537,953 | 5/1925 | Lucich............143/135 A UX |
| 2,984,269 | 5/1961 | Gates.....................143/135 R |

FOREIGN PATENTS OR APPLICATIONS

| | | |
|---|---|---|
| 60,383 | 4/1954 | France..................143/135 A |

*Primary Examiner*—Donald R. Schran
*Attorney*—Wayland D. Keith

[57] ABSTRACT

An elongated drag saw for sawing trees, which has saw elements in abutting relation and which saw elements are pulled behind a traction element in a path other than straight, so that the toothed elements on the saw will engage trees and undergrowth to cut the trees and undergrowth at the surface of the ground or slightly therebelow. The cutting element has teeth on opposed longitudinal sides thereof, which toothed elements are mounted on a plurality of cables in such manner that the drag saw may be pulled by the cables from either end thereof. Provision is made for removing the toothed bars on which the saw teeth are formed and for removing the saw elements from the cables and for replacing the saw elements thereonto. The saw elements are so constructed as to have great mass so that contact with the trees or the like will not impart lateral movement thereto, but will enable the saw to readily cut vegetation.

11 Claims, 7 Drawing Figures

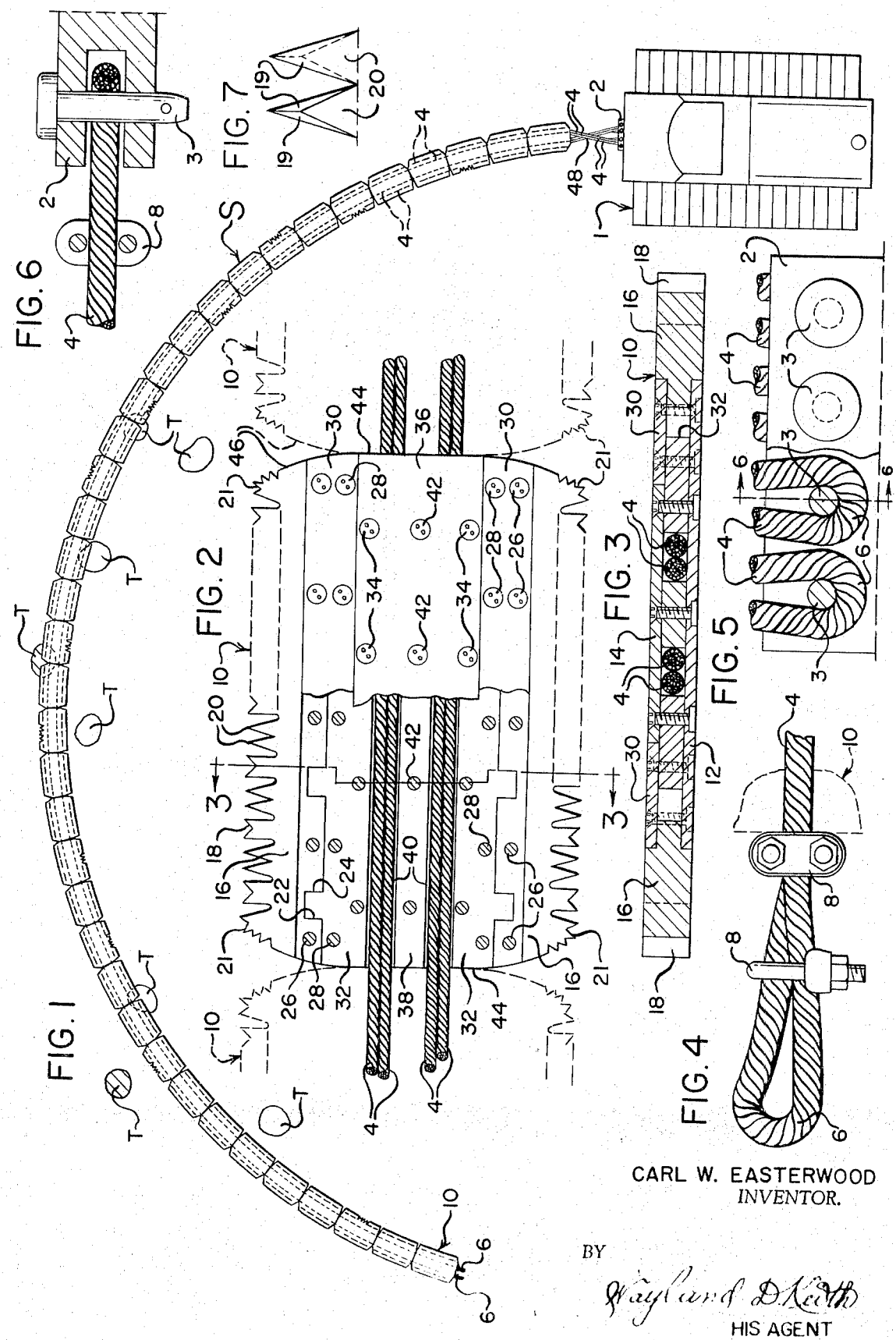
CARL W. EASTERWOOD
INVENTOR.
BY
Wayland D Keith
HIS AGENT

DRAG SAW

BACKGROUND OF THE INVENTION

The present invention relates to improvements in drag saws and more particularly to drag saws for use with a traction element, which saws utilize a plurality of saw elements, which saw elements are connected together and are pulled by the traction element.

It is desirable to provide a drag saw for use with a traction element, which saw has sufficient mass that, when the saw is pulled over the terrain, it will engage the trees, brush and the like, at or below the surface of the ground whereby the growth will be cut in such manner as to leave the ground smooth and free of underbrush, trees and the like.

It is difficult to provide an effective drag saw incorporating the above mentioned design characteristics. Prior drag saws, in so far as known, have been relatively light in weight and depended upon substantial force from the traction element to maintain the saw in engaged relation with the growth being cut, which did not provide satisfactory operating characteristics.

PRIOR ART

The following patents are from the prior art of which the applicant is aware:

| No. 1 897 820 | Pitchford | Feb. 14, 1933 |
| No. 1 954 905 | Wheat | Apr. 17, 1934 |
| No. 2 751 736 | Hessemer | June 26, 1956 |
| No. 3 301 285 | Cline | Jan. 31, 1967 |
| No. 3 344 821 | Paganini | Oct. 3, 1967 |

OBJECTS OF THE INVENTION

An object of this invention is to provide a drag saw of great mass, which, when it engages a tree, will cut therethrough, rather than being moved laterally upon the engagement with the tree.

Another object of the invention is to provide a drag saw which has teeth on opposed, horizontal sides thereof, so the saw will cut a path through the trees and the like, regardless of the path traversed by the traction element.

Still another object of the invention is to provide a drag saw which is assembled of component parts, in order that a worn part may be readily removed and replaced.

Yet a further object of the invention is to provide, as a saw pulling arrangement of multiplicity of cables, the end portions, which extend sufficiently to connect in crossed relation to a traction element, in order to normalize the pull thereon, while the saw is traveling in an arcuate pattern.

Yet another object of the invention is to provide saw elements, the adjacent ends of which are flattened for abutment when in one position, and which saw elements each has an arcuate portion thereof tangent to the flattened portion so the saw elements may rock about the arcuate portions without damage to the cable.

Still another object of the invention is to provide a cable arrangement which will enable the traction element to be disconnected from the adjacent end of the cable and moved to the opposite end thereof to be connected thereto to move the drag saw in the opposite direction.

SUMMARY OF THE INVENTION

A plurality of flat, plate like saw means, of relatively great mass, with opposed, horizontally extending teeth, which saw means are fixed against longitudinal movement on a plurality of cable means, the cable means being adapted to be connected to a traction element, at either end thereof.

The saw means being assembled of component elements, which removably receive cables therein and therethrough, and which saw elements have removable toothed bars secured to each side thereof with interengaging tangs, so as to secure the toothed bars thereon against relatively longitudinal movement with respect to the component saw elements. The teeth of the saw elements are preferably formed of an alloy metal to produce a hard, wear resistant teeth, or the teeth have a hardened surface of wear resistant material, such as carbide diamonds or the like. The elements of the saw means may be up to 4 feet in length, as much as 32 inches in width and about 2 inches in thickness, and each may weight several thousand pounds. When the saw elements are arranged in end to end relation on a multiplicity of cables, a large size crawler type traction element is required pull the saw means thus formed. Because of the weight, the saw means will normally settle into the ground, thus to sever the trees and other growth at or below ground level. A few feet of lineal travel of the drag saw, while the saw means is being held in arcuate contact with the trees and the like the growth will be severed, due to the movement of the traction element, thereby to efficiently cut the growth as the traction element drags the saw in a path other than a straight line, to cause the saw to be biased against the trees while the traction element moves the drag saw longitudinally.

BRIEF DESCRIPTION OF THE DRAWING

FIG. 1 is a diagrammatic, top plan view of a traction element of the crawler type, to which a plurality of cables are attached, which cables mount drag saw elements in end to end relation, with an abutment of the distal end of the cable to maintain the drag saw elements in contact relation;

FIG. 2 is an enlarged, top plan view, with parts broken away and with parts being shown in section to bring out the details of construction, showing fragmentary, phantom portions, in dashed outlines of adjacent drag saw elements;

FIG. 3 is a sectional view, taken on the line 3—3 of FIG. 2, looking in the direction indicated by the arrows;

FIG. 4 is an enlarged, fragmentary view showing a end of a cable formed into a loop and clamped to form an abutment for abutting against the saw element when moved in one direction, and which loop forms a hitch arrangement for connection to the traction element, when the drag saw is moved in the opposite direction;

FIG. 5 is an enlarged, top plan view of a fragmentary portion of the tractor draw bar to which the cables are connected, with parts broken away and with parts being shown in section, to bring out the details of construction;

FIG. 6 is a sectional view taken on the line 6—6 of FIG. 5, looking in the direction indicated by the arrows;

FIG. 7 is an enlarged, fragmentary view showing the construction of the teeth.

DESCRIPTION OF THE PREFERRED EMBODIMENT

With more detailed reference to the drawing in which like reference characters designate like parts in the several views thereof, the numeral 1 designates generally a traction element having a draw bar 2, with attachment pins 3, by which to attach a multiplicity of cables 4 to the draw bar 2. In the present instance the cables 4 each have a loop 6 formed at the end thereof by clamps 8 securing the loop of each cable in binding relation. It is preferable to have a loop 6 on each end of each cable 4 with a clamp 8 forming an abutment on the end of each cable opposite the draw bar 2. The clamps 8 serve as an abutment to engage the distal member of a saw element of saw S. The multiplicity of cables 4 are positioned within the body of each saw element to between plates 12 and 14.

The plate 12 is positioned on the lower side of the saw element 10 and is secured to opposed saw toothed bars 16, which bars 16 have teeth 18 and 20 formed on a side thereof. The teeth 20 have beveled cutting edges 19 thereon, which beveled edges are arranged in opposed relation on adjacent teeth. Teeth 21 are positioned on each of the rounded ends of toothed bar 16, so as to perform a cutting action, regardless of the engagement of the saw teeth with a tree T. The inner portion of each bar 16 is notched, as indicated at 22 to receive lugs 24 therein in complementary relation, so as to relieve bolts 26 and 28 of shear strain. The bolts 26 also bolt one edge of each plate 30 to each edge of the bar 16 and to plate 12. The opposite edge of each plate 30 is secured to a filler bar 32, through which filler bar the bolts 28 pass and through plate 12 to engage the respective toothed bars 16 to rigidly connect to plate 12 and to the plates 30. Further bolts 34 pass through plate 12 and the inner side of filler bars 32 so as to rigidly secure the filler bars 32 between a cable cover plate 36 and plate 12. A medial spacer bar 38 is spaced inward from filler bars 32 to provide openings 40 for pairs of parallel cables 4, which are positioned in each of the openings 40. Bolts 42 pass through plate 12, medial spacer bar 38 and plate 36 to hold the spacer bar 38 in aligned relation with respect to saw element 10. The saw element 10 is preferably of great mass and in some instances will be as much as four feet in length, thirty two inches in width, and two inches thick, and will weigh several thousand pounds. With a multiplicity of these saw elements 10 secured about cables 4 to be pulled by traction element 1, a saw of the desired length may be had.

The ends 44 of the saw element 10 are straight for a space slightly greater that the spacing of the cables 4, with the corners of the saw elements 10 being arcuate, as indicated at 46, which corners are tangential to the straight portion 44, so, upon movement of the traction element 1 laterally, a rolling action between the saw elements 10 is had.

The pairs of cables 4 are preferably crossed, as indicated at 48, immediately rearward of the traction element 1 so as to permit yielding of the cables 4 as the traction element moves arcuately in the course of the travel thereof. It is preferable to have the cables laid in pairs, side by side in the respective longitudinal openings 40 and 40 to enable greater pull to be exerted on the drag saw, which is designated generally at S.

Each end of each cable has a loop 6 formed thereon for attachment to draw bar 2 by pins 3, as will best be seen in FIGS. 5 and 6. With each of the cables 4 having a loop on the opposite end thereof, the drag saw S can be pulled from either end with the same efficiency, and since the teeth 18 and 20 are on each side of the saw elements 10, and the saw elements are of such mass as to lay flat on the terrain or even be embedded therein as the saw is moved over the terrain, by transversing a course other than straight, by the traction element 1, the cables on the outside of the arc, when the traction element is turned will be extended and the cables on the inside of the arc will be tightened, to more nearly present even tension on all cables to enable trees T, or other growth, to be severed at the surface of the ground or below the surface of the ground.

By removal of bolts 34 and 42 from plate 36, the cables may be removed from openings 40 or replaced thereinto to enable individual elements 10 to be removed and replaced onto the cables by removal of bolts 26 from either or both sides of the saw element 10, one or both saw bars 16 may be removed and replaced.

It is preferable to have the teeth 20 with beveled cutting edges 19 on opposite sides, with the bevel edges being arranged in opposed relation on adjacent teeth, with the drag teeth 18 removing the kerf left by the cutting teeth 20. This enables greater cutting speed of the saw S, as it is moved over the terrain in contact with trees T.

The flexible elements 4 are preferably of resilient spring steel cable, which will enable the yielding of the cables sufficiently that, when the traction element 1 is turned, the pull on the resilient spring steel cables will equalize, due to the resiliency, to enable the drag saw elements 10 to be properly tensioned thereon.

What is claimed is:

1. A drag saw to be pulled behind a traction element, which drag saw comprises;
   a. a plurality of elongated, toothed saw elements of relatively great mass,
      1. each said saw element has two opposed, elongated sides flattened over the respective areas thereof,
      2. each said saw element has two elongated opposed edges on which saw teeth are formed throughout the greater portion of the length thereof,
      3. said saw elements being adapted to be positioned in end to end relation,
   b. each said elongated saw element having spaced apart openings formed longitudinally therethrough,
   c. elongated flexible elements passing through the longitudinal openings in each said elongated, toothed saw element,
   d. anchor means on the distal ends of said flexible elements, which anchor means is in abutting relation with the distal end of the distal elongated, toothed element, and being remote with respect to the traction element, and
   e. connection means near the other end of said flexible elements by which to connect said flexible elements with the traction element to pull a plurality of elongated, toothed saw elements over the terrain to perform a sawing action.

2. A drag saw as defined in claim 1; wherein
a. said flexible element passing through the longitudinal openings in said saw elements, is a plurality of cables.
3. A drag saw as defined in claim 2; wherein
a. said plurality of cables, which pass through said elongated, toothed saw elements, are spaced apart transversely of said elongated toothed elements.
4. A drag saw as defined in claim 2; wherein
a. said cables are connected to said traction element, in crossed relation adjacent thereto, to enable the outer cable to yield and the inner cable to tighten upon the turning of the traction element.
5. A drag saw as defined in claim 1; wherein
a. each said flexible element has an abutment formed on each end thereof, and
b. connection means on each end of each said flexible element to connect with the traction element to enable the drag saw to be pulled from either end.
6. In a saw element for use as a drag saw,
a. an elongated body,
b. toothed elements extending along at least one side of said elongated body,
c. said body having at least one elongated opening formed therethrough longitudinally thereof to receive a flexible element therein,
d. said elongated body has arcuate corners,
   1. teeth formed on said arcuate corners for a portion of the length thereof, and
e. the longitudinal ends of said body being flattened for a portion of the medial length thereof and being at a right angle to a longitudinal medial line passing through said body.
7. A saw element as defined in claim 6; wherein
a. said body has a bar detachably connected to a longitudinal side thereof, on which bar said teeth are formed.
8. A saw element as defined in claim 7; wherein
a. said bar and said body have complementary recesses and lugs formed along adjacent longitudinal sides thereof to interlock said bar and said body against relative longitudinal movement.
9. A saw element as defined in claim 6; wherein
a. said body has at least two transversely spaced apart openings formed longitudinally therethrough, each to receive a flexible element therein,
b. detachable cover means engaging with said body to close said openings when said cover is in one position, and
c. said flexible elements are connected to a traction element in crossed relation adjacent thereto to enable the outer flexible element to yield and the inner flexible element to tighten upon change of course of the traction element so as to evenly distribute the pull of the traction element on said flexible elements when pulling in any direction.
10. A saw element as defined in claim 6; wherein
a. said elongated body has arcuate corners,
   1. teeth formed on said arcuate corners for a portion of the length thereof, and
b. the longitudinal ends of said body being flattened for a portion of the medial length thereof and being at a right angle to a longitudinal medial line passing through said body.
11. A saw element as defined in claim 6; wherein
a. said body has a bar detachable connected, by bolts, to each longitudinal side thereof, on which bars teeth are formed,
b. said body is made up of a multiplicity of components, and has detachable, toothed bars on each side thereof,
   1. a spacer bar interlocking with each said toothed bar,
   2. a further spacer bar positioned medially of said body and forming an opening on each side thereof,
c. plates secured to each side of said body by said bolts, so a pair of longitudinal openings will be formed therethrough, with one of said plates being removable for the insertion and removal of cable elements, and
   1. one of said plates on each side being secured to said body by said bolts to enable the removal and replacement of said longitudinal, toothed bar on each said saw elements.

* * * * *